United States Patent
Lyubomirsky et al.

(10) Patent No.: US 10,110,978 B2
(45) Date of Patent: Oct. 23, 2018

(54) WAVELENGTH DIVISION MULTIPLEXER WITH PACKET SWITCHING BASED ON HEADER INFORMATION OR PERFORMANCE METRIC INFORMATION FOR OPTICAL CHANNELS

(71) Applicant: Facebook, Inc., Menlo Park, CA (US)

(72) Inventors: Ilya Lyubomirsky, Pleasanton, CA (US); Hans-Juergen Schmidtke, Mountain View, CA (US); Michael Louis Bortz, Los Altos Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/338,255

(22) Filed: Oct. 28, 2016

(65) Prior Publication Data

US 2017/0245030 A1     Aug. 24, 2017

Related U.S. Application Data

(60) Provisional application No. 62/297,743, filed on Feb. 19, 2016.

(51) Int. Cl.
*H04B 10/00* (2013.01)
*H04Q 11/00* (2006.01)
*H04J 14/02* (2006.01)
*H04B 10/079* (2013.01)

(52) U.S. Cl.
CPC ... *H04Q 11/0066* (2013.01); *H04B 10/07953* (2013.01); *H04J 14/02* (2013.01); *H04Q 11/0005* (2013.01); *H04Q 11/0062* (2013.01); *H04Q 2011/0016* (2013.01); *H04Q 2011/0079* (2013.01); *H05K 999/99* (2013.01)

(58) Field of Classification Search
CPC ...... H04J 14/02; H04J 14/021; H04J 14/0269; H04B 10/572; H04B 10/2581; H04B 10/032; H04B 10/038; H04B 10/5161; H04Q 11/0003; H04Q 11/0005; H04Q 11/0066; H04L 45/62; H04L 69/22
USPC ....... 398/183, 188, 192, 193, 194, 195, 196, 398/197, 198, 162, 33, 38, 2, 3, 4, 5, 45, 398/48, 49, 56, 79, 50, 51, 54, 57, 53, 398/158, 159, 136; 370/535, 389, 463, 370/216, 225, 228
See application file for complete search history.

(56) References Cited

U.S. PATENT DOCUMENTS

| | | | |
|---|---|---|---|
| 5,629,836 | A | 5/1997 | Wright et al. |
| 5,729,752 | A | 3/1998 | Snider et al. |
| 5,997,326 | A | 12/1999 | Koradia et al. |

(Continued)

OTHER PUBLICATIONS

U.S. Appl. No. 15/291,263 by Schmidtke, H. et al., filed Oct. 12, 2016.

(Continued)

*Primary Examiner* — Hanh Phan
(74) *Attorney, Agent, or Firm* — Van Pelt, Yi & James LLP

(57) ABSTRACT

A data communication system for transmitting packets over one or more optical fibers includes a transponder with a number of digital signal processors that transmit data packets on different optical channels. The transponder includes a switch that receives a data packet on an input and selects one of the digital signal processors to transmit the packet based on quality metrics for the different optical channels and/or information included in an OSI header for the data packet.

19 Claims, 3 Drawing Sheets

(56) References Cited

U.S. PATENT DOCUMENTS

| | | |
|---|---|---|
| 6,373,713 B1 | 4/2002 | Jensen et al. |
| 6,381,146 B1 | 4/2002 | Sevier et al. |
| 6,422,876 B1 | 7/2002 | Fitzgerald et al. |
| 6,637,846 B2 | 10/2003 | Yang et al. |
| 6,814,582 B2 | 11/2004 | Vadasz et al. |
| 7,050,307 B2 | 5/2006 | Doblar et al. |
| 7,092,642 B2 * | 8/2006 | Way .................. H04B 10/50 398/192 |
| 7,435,095 B1 | 10/2008 | Yi et al. |
| 8,154,867 B2 | 4/2012 | Shearman et al. |
| 8,837,942 B2 * | 9/2014 | Kang ............... H04J 14/0269 398/51 |
| 9,136,624 B1 | 9/2015 | Reynov et al. |
| 9,686,886 B2 | 7/2017 | Okada et al. |
| 2003/0080568 A1 | 5/2003 | Busby et al. |
| 2004/0002237 A1 | 1/2004 | Doblar et al. |
| 2004/0047128 A1 | 3/2004 | McClelland, II et al. |
| 2005/0207134 A1 | 9/2005 | Belady et al. |
| 2006/0049727 A1 | 3/2006 | Corsini et al. |
| 2006/0121421 A1 | 6/2006 | Spitaels et al. |
| 2007/0184676 A1 | 8/2007 | Minich et al. |
| 2011/0013348 A1 | 1/2011 | Seibold et al. |
| 2012/0120596 A1 | 5/2012 | Bechtolsheim et al. |
| 2013/0337665 A1 | 12/2013 | Cohen et al. |
| 2014/0098492 A1 | 4/2014 | Lam et al. |
| 2014/0206273 A1 | 7/2014 | Larsen et al. |
| 2014/0307400 A1 | 10/2014 | French et al. |
| 2014/0362874 A1 * | 12/2014 | Nishimoto .......... H04B 10/616 370/535 |
| 2015/0229438 A1 * | 8/2015 | Le Taillandier De Gabory .......... H04B 10/2581 398/182 |
| 2016/0077556 A1 | 3/2016 | Yang et al. |
| 2016/0128230 A1 | 5/2016 | Dogruoz et al. |
| 2016/0197679 A1 * | 7/2016 | Tanaka ................ H04B 10/572 398/79 |
| 2017/0329371 A1 | 11/2017 | Schmidtke et al. |
| 2017/0331766 A1 | 11/2017 | Schmidtke et al. |
| 2017/0332506 A1 | 11/2017 | Schmidtke et al. |
| 2017/0332518 A1 | 11/2017 | Schmidtke et al. |
| 2017/0332519 A1 | 11/2017 | Schmidtke et al. |

OTHER PUBLICATIONS

U.S. Appl. No. 15/291,293 by Schmidtke, H. et al., filed Oct. 12, 2016.
U.S. Appl. No. 15/291,313 by Schmidtke, H. et al., filed Oct. 12, 2016.
U.S. Appl. No. 15/291,324 by Schmidtke, H. et al., filed Oct. 12, 2016.
U.S. Appl. No. 15/291,348 by Schmidtke, H., et al., filed Oct. 12, 2016.
U.S. Appl. No. 15/725,239 by Taylor, J., et al., filed Oct. 4, 2017.
Non-Final Office Action dated Aug. 29, 2017 for U.S. Appl. No. 15/291,293 by Schmidtke, H., et al., filed Oct. 12, 2016.
U.S. Appl. No. 15/655,795 by Schmidtke, H. et al. filed Jul. 20, 2017.
U.S. Appl. No. 15/706,561 by Schmidtke, H. et al. filed Sep. 15, 2017.
U.S. Appl. No. 15/705,205 by Schmidtke, H. et al. filed Sep. 14, 2017.
U.S. Appl. No. 15/716,454 by Schmidtke, K. filed Sep. 26, 2017.
Notice of Allowance dated Jul. 3, 2017 of U.S. Appl. No. 15/291,313 of Schmidtke H., et al., filed Oct. 12, 2016.
Corrected Notice of Allowability dated Nov. 21, 2017 for U.S. Appl. No. 15/291,313 by Schmidtke, H., et al., filed Oct. 12, 2016.
European Perforators Association "The Advantages of Perforated Metals" Aug. 21, 2016, EUROPERF.
Non-Final Office Action dated Nov. 17, 2017 for U.S. Appl. No. 15/291,348 by Schmidtke, H., et al., filed Oct. 12, 2016.
Non-Final Office Action dated Nov. 24, 2017 for U.S. Appl. No. 15/291,263 by Schmidtke, H., et al., filed Oct. 12, 2016.
Notice of Allowance dated Dec. 6, 2017 for U.S. Appl. No. 15/291,293 by Schmidtke, H., et al., filed Oct. 12, 2016.

* cited by examiner

WAVELENGTH DIVISION MULTIPLEXER WITH PACKET SWITCHING BASED ON HEADER INFORMATION OR PERFORMANCE METRIC INFORMATION FOR OPTICAL CHANNELS

CROSS-REFERENCES TO RELATED APPLICATIONS

This application claims the benefit of commonly assigned U.S. Provisional Patent Application Ser. No. 62/297,743, filed on Feb. 19, 2016, and entitled "WAVELENGTH DIVISION MULTIPLEXER WITH PACKET SWITCHING BASED ON HEADER INFORMATION OR PERFORMANCE METRIC INFORMATION FOR OPTICAL CHANNELS," the disclosure of which is hereby incorporated herein in its entirety by reference.

TECHNICAL FIELD

The disclosed embodiments relate to communication systems and in particular to wavelength divisional multiplexers for use in communicating over fiber optic links.

BACKGROUND

Long haul internet traffic is often carried by optical fibers. Wavelength division multiplexing (WDM) is a technique whereby transmitters encode and transmit different signals onto different wavelengths of light (e.g. different optical channels) that are combined and carried on the same optical fiber. Optical filters at a receiving end of the fiber separate received light into the various component wavelengths that are provided to separate optical detectors that recover the encoded signals.

In conventional WDM systems, the path from a data source to an optical encoder is generally fixed. For example, FIG. 1 shows a conventional WDM data transmission system 10 that receives data from a number of data sources S1, S2, S3 and S4 and transmits the data over a common optical fiber 40. Such data sources are typically Internet Protocol (IP) routers but could be other sources of internet data. The data streams from one or more of the sources S1-S4 are applied to a fixed optical transponder 20 having digital signal processors 22, 24, 26 and 28 that transmit the data as modulated light beams. The digital signal processors (DSPs) 22-28 operate to transmit the data as an optical signal having a particular wavelength lambda-1, lambda-2, lambda-3 or lambda-4. In addition, the DSPs may select a modulation type (e.g. QPSK, 8QAM, 16QAM etc.) as well as a type of error checking code with which the data are transmitted.

In conventional systems, the mapping of a particular data source to a particular optical encoder is typically fixed when the transponder is set up. In the example shown, data from source S1 are always transmitted via DSP 22 on wavelength lambda-1, while data from source S3 are always transmitted via DSP 26 on wavelength lambda-3. In some instances this may not optimize the capacity of the fiber optic communication link.

There are occasions where some optical channels using a particular wavelength will have one or more differing channel characteristics compared to other optical channels. Such characteristics can include differing bit error rates, signal to noise ratios, fading, dispersion or leakage from the fiber or other factors which affect the speed and/or accuracy of the data transmission for that channel.

DETAILED DESCRIPTION

Figure 1:
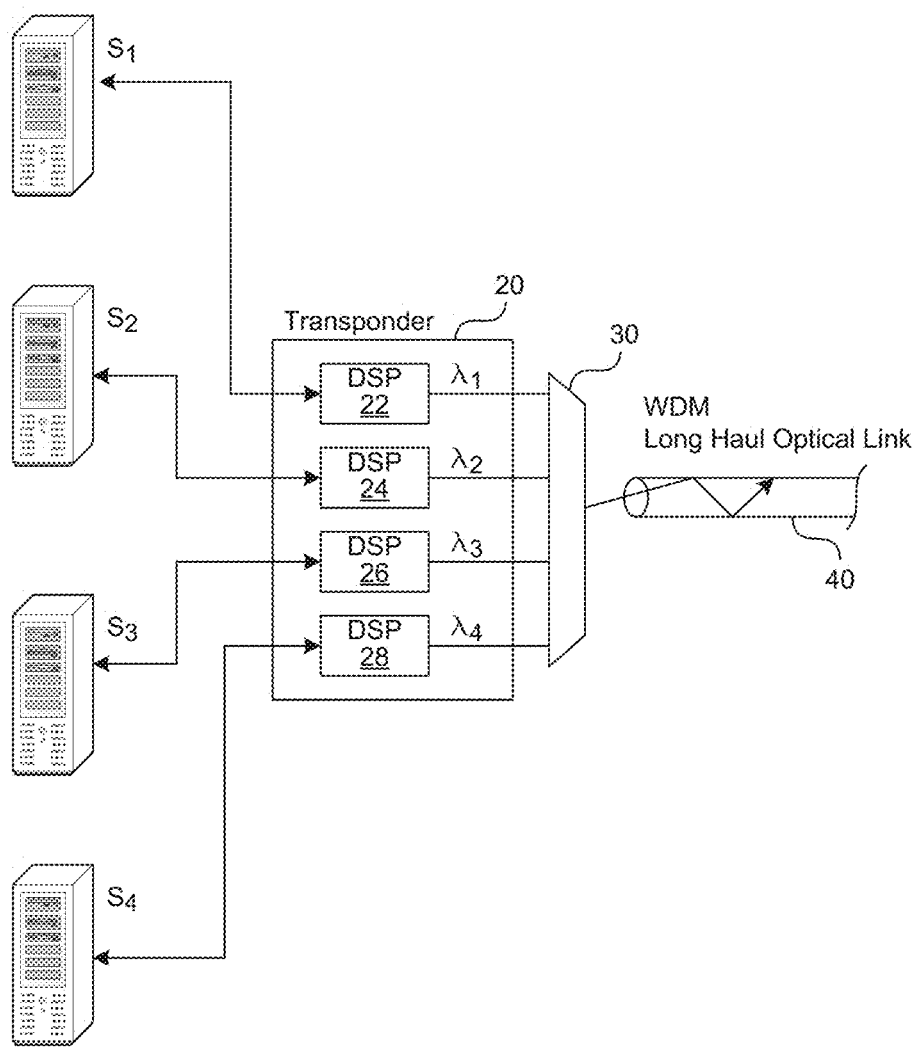
FIG. 1 is a simplified diagram of a conventional wavelength division multiplexing communication system.
Figure 2:
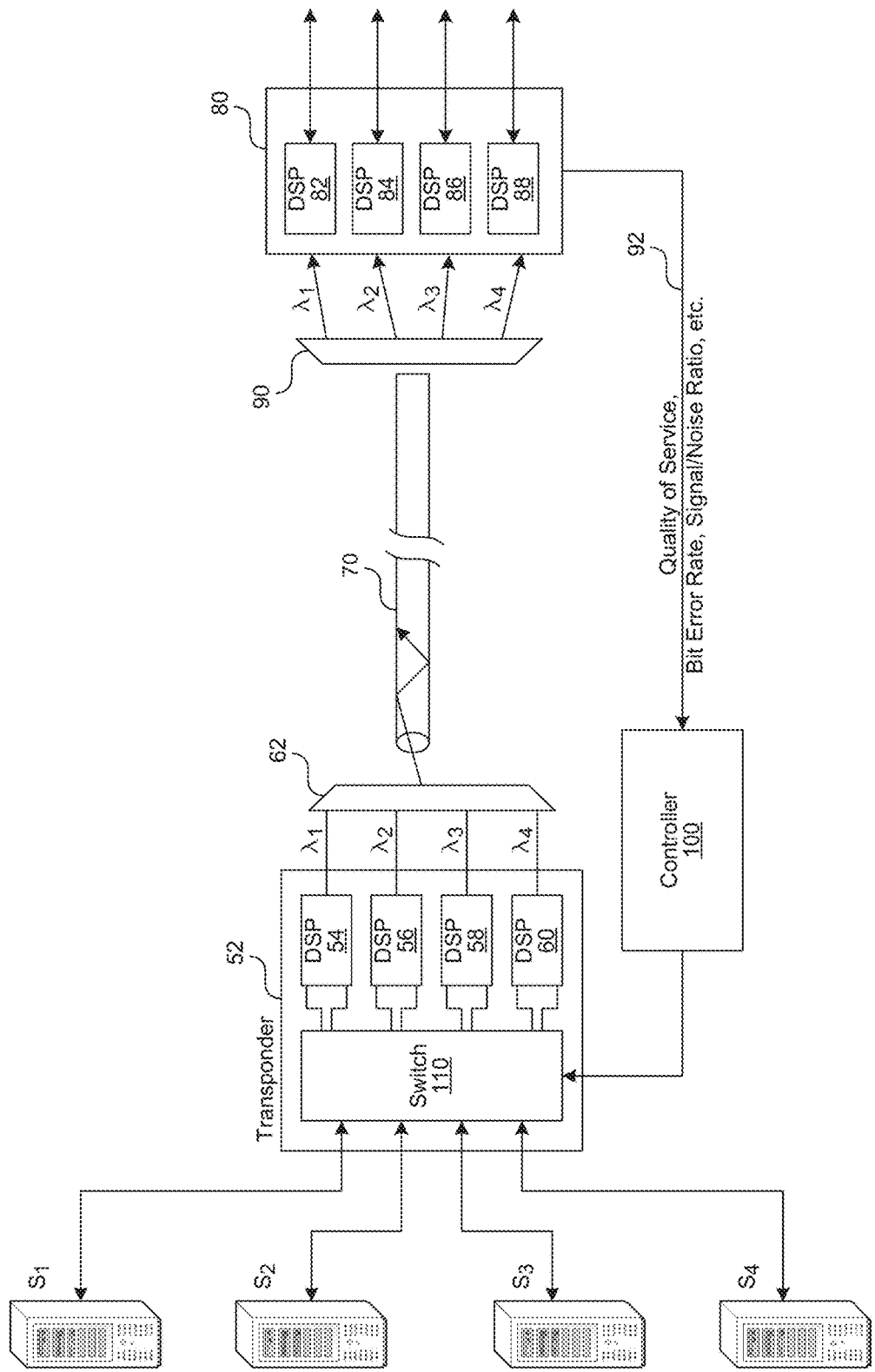
FIG. 2 is a simplified diagram of a wavelength division multiplexing communication system in accordance with some embodiments of the present disclosure.

To address the problems referenced above, the present disclosure is directed to a wavelength division multiplexing communication system that selectively directs data from a number of data sources to one of a number of different DSP encoders/decoders that transmit data on different optical channels. As shown in FIG. 2, a communication system 50 includes a transponder 52 that includes a number of optical encoder/decoder DSPs 54, 56, 58, 60 that transmit data from a number of sources S1, S2, S3 and S4 via one or more optical fibers 70. Each of the DSPs sends and receives optical signals on a particular optical channel wavelength lambda-1, lambda-2, lambda-3 or lambda-4. On the transmit side, an optical combiner 62 can combine the signals for the various channels and direct them into the one or more optical fibers 70. In some embodiments, the optical fiber 70 is a multi-mode optical fiber of a type well known in the art. In another embodiment, the optical channels are carried on separate optical fibers. In yet another embodiment, an optical fiber includes multiple cores, each of which can carry data for one or more optical channels.

At the receiving end of the communication system is a receiving optical transponder 80 having a number of encoder/decoder DSPs 82, 84, 86 and 88. Depending on the number of fibers used, the receiving transponder can include a number of optical filters 90 that operate to separate the light received from the optical fiber 70 into the various constituent wavelengths lambda-1, lambda-2, lambda-3 and lambda-4 on which the data were sent.

As is known in the art, the receiving DSPs 82, 84, 86 and 88 convert the modulated light into corresponding digital data. In addition in some embodiments, the receiving DSPs can provide quality metrics about the optical signals they receive. Such quality metrics can include one or more measures of a channel's bit error rate, signal to noise ratio, received bits per second, light attenuation or dispersion and other measurements that relate to how much or how fast data is received on a particular optical channel and/or how well the data are received.

In the embodiment shown, the quality metrics from the DSPs in the receiving optical transponder 80 are sent via a back haul fiber 92 or other communication link to a controller 100 where they are accessible by the sending transponder 52. The transponder 52 is also functionally connected to a switch 110. Switch 110 is preferably a packet switch or an Ethernet switch that can selectively route packets from an input to one or more outputs. Switch 110 may be in the same housing as the transponder 52 or may be a separate piece of equipment that is communicatively coupled to the transponder 52. In some embodiments, the switch 110 is an integral portion of transponder 52. That is, the switch 110 and transponder can form a common, unseparable unit, e.g., having a common circuit board, application-specific integrated circuit, etc.

In the embodiment shown, the switch 110 receives data packets from the data sources S1, S2, S3 and S4 on a number of inputs. In some embodiments, the switch 110 receives one or more of the quality metrics from the controller 100 (or other sender of the metrics). A processor in the switch or transponder (not shown) analyzes one or more of the received quality metrics to determine which of the DSPs and its associated optical channel should be used to send the data packets from a particular data source. In one embodiment, all the data packets from a particular data source are routed to a selected DSP. In another embodiment, the selection of which DSP is used to send a data packet can be made on a packet by packet basis. In the embodiment shown, the switch 110 is able to route data from any input to any of the outputs (e.g., and DSPs). In another embodiment, the switch 110 is able to route data from an input to less than all of the outputs.

In some embodiments, a processor or other logic (not shown) in the switch 110 analyzes the header information such as information in the level 2 and/or level 3 headers of the data packets (e.g., TCP/IP packets) received from the data sources to help select which optical channel should be used to send the data packet. Packets with a low latency requirement (e.g. video streaming) can be sent on the optical channel with the highest throughput or lowest latency. Packets that require no errors in transmission (e.g. banking or financial data) can be sent on a channel with the lowest error rate. In yet another example, if the acceptable error rate of a data packet is requested to be very low, then the switch can be programmed to duplicate the packet and send both packets over different optical channels in order to increase the likelihood that the packet will be received without errors. Thus, the system provides much more adaptability through configuration than is possible in the prior art.

Because the switch 110 is in communication with the DSPs 52-60, the switch 110 is able to share the header information (e.g., TCP/IP or OSI header information) such as the level 2 and level 3 header information with the DSPs along with a quality of service required for one or more packets that are routed to the DSPs. The selected DSP can then adjust aspects of the transmission (e.g. modulation type, bit rate, error correction codes, optical power etc.) to meet the desired quality of service for the data to be transmitted. The following table provides examples of information in the OSI headers that can be used to select which optical channel should be used to send a data packet. As would be recognized by those having ordinary skill in the art, information in other level headers for the data packets could also be used to select the channel and transmission method for the data packet.

Because the quality of the channels can vary over time, in some embodiments, the DSPs at the receiving end of the communication link continually measure their service metrics for their associated optical channel and send the metrics to the controller 100. For example, an optical channel may degrade over time or a fiber may break or be cut. Because the switch 110 analyzes the channel metrics, the optical channels that are used to carry the data can be dynamically adjusted to optimize the overall optical communication link. In various embodiments, the DSPs at the receiver The transponders 52 and 80 as shown in FIG. 2 can be either uni-directional or bi-directional. It is not necessary that the receiving transponder 80 have a corresponding switch to select a channel to send data in the reverse direction. However, the transponder 80 can include a switch like the switch 110. In this case, the DSPs 52-60 determine quality metrics for the channels on which packets are received and provide the quality metrics to the controller 100 to be accessed by the switch in the transponder 80.

In some embodiments, the transponders 52 and 80 employ software (not illustrated) that provide a general platform for communications and enable a pluggable hardware architecture, e.g., to use and/or substitute transponders, amplifiers, filters, etc. Thus, the software transport layer acts as a "white box" for access to disparate hardware components. In so doing, the hardware system can abstract away the details of the underlying hardware architecture, yet still enable flexibility and modularity while providing automated adjustments for bandwidth, error correction, or indeed almost any controllable data networking variable. This software thus is a functional "operating system" for the underlying hardware components.

Figure 3:
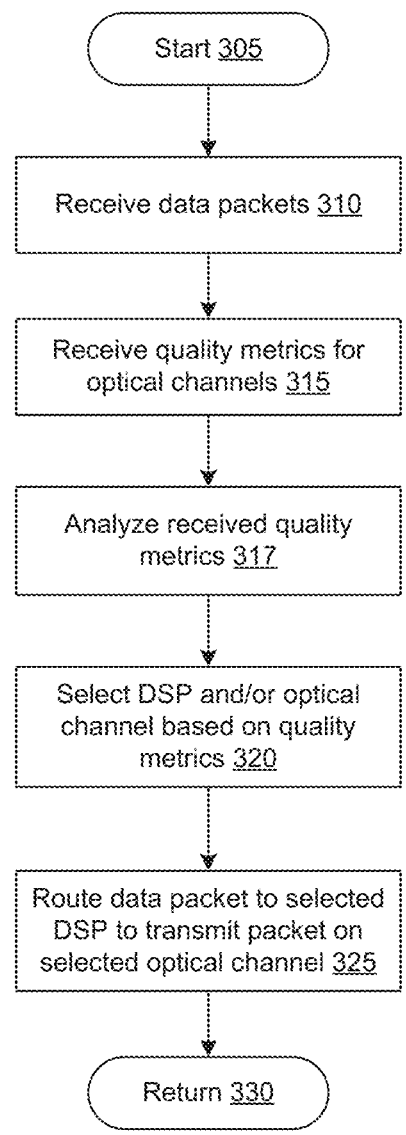
FIG. 3 is a flow diagram illustrating a method invoked by the wavelength division multiplexing communication system in accordance with some embodiments of the present disclosure.

FIG. 3 is a flow diagram illustrating a method invoked by the wavelength division multiplexing communication system in accordance with some embodiments of the present disclosure. The routine can be invoked by various computing devices, e.g., a transponder in an optical communication system. In various embodiments, the routine starts at block 305 and at block 310, receives data packets at various inputs from various data sources. At block 315, the routine receives one or more quality metrics various optical channels used to transmit data packets over a fiber optic link. One skilled in the art would know what quality metrics are pertinent to optical communications, e.g., signal to noise ratio, wavelength accuracy, modulation rate, etc. At block 317, the routine analyzes the received quality metrics, e.g., to identify which optical channels and/or DSPs are presently offering desirable characteristics (e.g., best throughput). At block 320, the routine selects a DSP and/or optical channel. At block 325, the routine routes a data packet to a selected digital signal processor to transmit the packet on a selected optical channel at least in part on the basis of the one or more received quality metrics.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A communication system, comprising:
a transponder having a number of inputs that are configured to receive data packets from a number of data sources and a number of digital signal processors that are configured to send the data packets on a corresponding optical channel of optical channels of an optical fiber; and
a switch that is configured to analyze a plurality of different categories of quality metrics of the optical channels, including a first quality metric associated with a communication latency and a second quality metric associated with a communication error rate, and to route each of one or more of the data packets from an input of the transponder to a corresponding selected digital signal processor among the number of digital signal processors on the basis of at least one of the analyzed plurality of different categories of quality metrics, wherein the switch includes a processor configured to analyze corresponding header information of the one or more of the data packets received at the input of the transponder and to select the one or more corresponding selected digital signal processors among the number of digital signal processors to send the one or more of the data packets based at least in part on the corresponding header information and the plurality of different categories of quality metrics of the optical channels including the first quality metric associated with the communication latency and the second quality metric associated with the communication error rate, including by being configured to determine a corresponding requirement associated with at least one of the corresponding header information and compare the corresponding requirement with at least one of the plurality of different categories of quality metrics.

2. The system of claim 1, wherein the quality metrics include a bit error rate.

3. The system of claim 1, wherein the quality metrics include a signal to noise ratio.

4. The system of claim 1, wherein the quality metrics include a data transfer rate.

5. The system of claim 1, wherein the quality metrics include a dispersion amount of the optical fiber.

6. The system of claim 1, wherein the selected digital signal processor is configured to adjust a modulation scheme based at least in part on the corresponding header information.

7. The system of claim 1, wherein the selected digital signal processor is configured to adjust a transmission rate based at least in part on the corresponding header information.

8. The system of claim 1, wherein the selected digital signal processor is configured to adjust a type of error correction code to be used with the one or more of the data packets based at least in part on the corresponding header information.

9. The system of claim 1, wherein the processor in the switch is configured to analyze latency requirements of a selected data packet received at the input of the transponder from the corresponding header information associated with the selected data packet and to select the corresponding digital signal processor based at least in part on the latency requirements of the selected the data packet.

10. A communication system, comprising:
a transponder having a number of inputs that are configured to receive data packets from a number of data sources and a number of digital signal processors that are configured to send each of the data packets on a corresponding optical channel of optical channels of an optical fiber; and
a switch including a processor that is configured to analyze corresponding OSI header information of one or more of the data packets received at an input of the transponder and to select one or more corresponding digital signal processors among the number of digital signal processors to send the one or more of the data packets based at least in part on the corresponding OSI header information and a plurality of different categories of quality metrics of the optical channels including a first quality metric associated with a communication latency and a second quality metric associated with a communication error rate, including by being configured to determine a corresponding requirement associated with at least one of the corresponding OSI header information and compare the corresponding requirement with at least one of the plurality of different categories of quality metrics.

11. The communication system of claim 10, wherein the corresponding OSI header information of a selected data packet specifies a latency requirement of the selected data packet and the switch is configured to select the corresponding digital signal processor to send the selected data packet at least in part on the basis of the latency requirement.

12. The communication system of claim 10, wherein the corresponding OSI header information of a selected data packet specifies an acceptable error rate for the selected data packet and the switch is configured to select the corresponding digital signal processor to send the selected data packet at least in part on the basis of the acceptable error rate.

13. The communication system of claim 10, wherein the corresponding OSI header information is from a level 2 and/or level 3 header of the corresponding data packet.

14. The communication system of claim 10, wherein the corresponding selected digital signal processor for a selected data packet is configured to set a transmit rate for the selected data packet based at least in part on the corresponding OSI header information for the selected data packet.

15. The communication system of claim 14, wherein an encoding associated with the selected data packet utilizes a type of error correction code that is selected based at least in part on the corresponding OSI header information for the selected data packet.

16. The communication system of claim 14, wherein an encoding associated with the selected data packet utilizes a modulation encoding scheme that is selected based at least in part on the corresponding OSI header information for the selected data packet.

17. A method of operating a transponder in an optical communication system, comprising:
receiving data packets at a number of inputs from a number of data sources;
receiving a plurality of different categories of quality metrics, including a first quality metric associated with a communication latency and a second quality metric associated with a communication error rate, for a number of optical channels used to transmit the data packets over a fiber optic link;
analyzing corresponding header information for one or more of the data packets received at an input; and
routing each of the one or more of the data packets to a corresponding selected digital signal processor to transmit the corresponding data packet on a corresponding selected optical channel at least in part on the basis of the one or more received quality metrics and the corresponding header information, wherein selections of the one or more corresponding selected digital signal processors are determined based at least in part on the corresponding header information and the plurality of different categories of quality metrics of the optical channels including the first quality metric associated with the communication latency and the second quality metric associated with the communication error rate, including by determining a corresponding requirement associated with at least one of the corresponding header information and comparing the corresponding requirement with at least one of the plurality of different categories of quality metrics.

18. The method of claim 17, further comprising analyzing one or more of the quality metrics with a processor in a switch and controlling the switch to deliver the corresponding data packet to the corresponding selected digital signal processor.

19. A method of operating a transponder in an optical communication system, comprising:
receiving data packets at a number of inputs from a number of data sources;
analyzing corresponding OSI header information for one or more of the data packets received at an input; and
routing each of the one or more of the data packets to a corresponding selected digital signal processor to transmit the corresponding data packet on a corresponding selected optical channel at least in part on the basis of the corresponding OSI header information for the corresponding data packet, wherein selections of the one or more corresponding selected digital signal processors are determined based at least in part on the corresponding OSI header information and the plurality of different categories of quality metrics of the optical channels including a first quality metric associated with a communication latency and a second quality metric associated with a communication error rate, including by determining a corresponding requirement associated with at least one of the corresponding OSI header information and comparing the corresponding requirement with at least one of the plurality of different categories of quality metrics.

* * * * *